Aug. 14, 1962    R. W. CARSTENS    3,049,031
LOCATING AND GUIDE DEVICE
Filed March 29, 1961
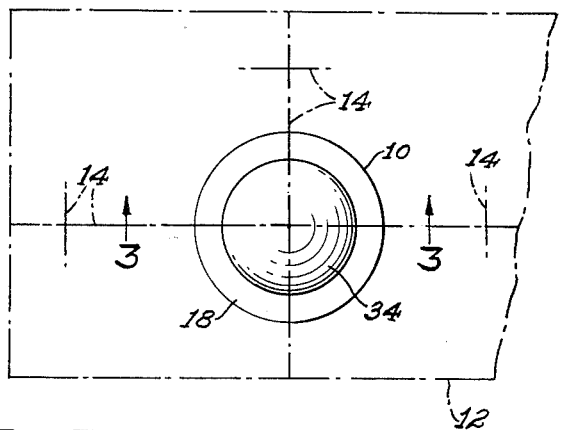
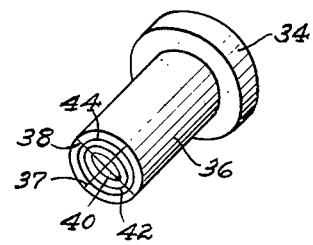
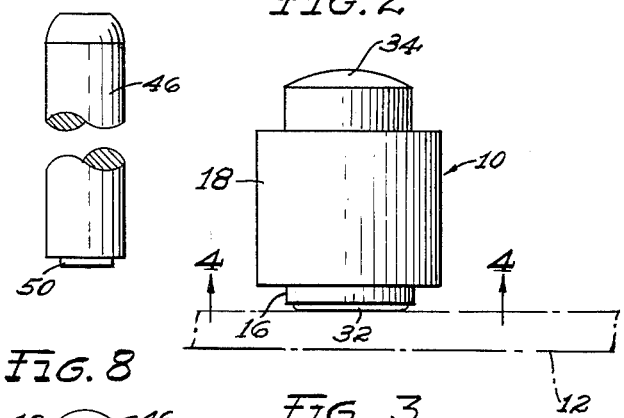
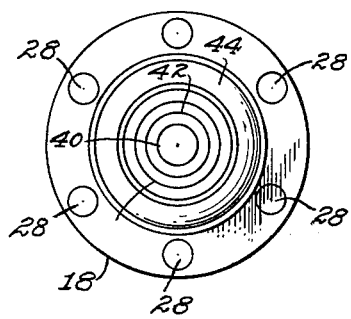
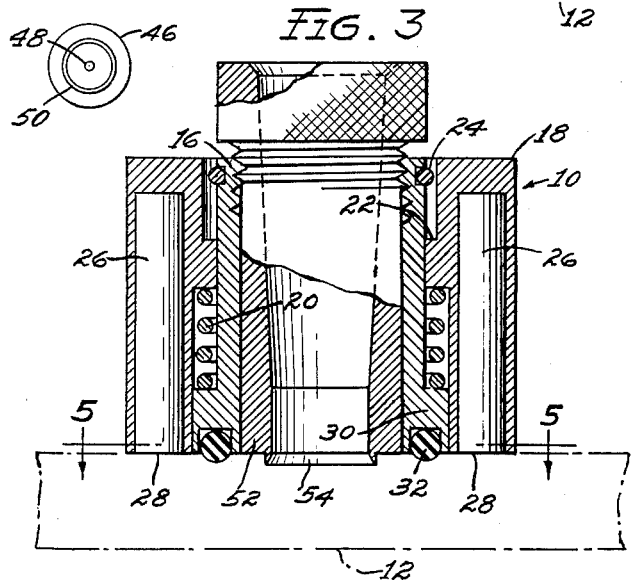
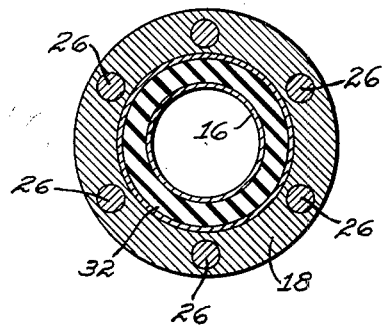
INVENTOR.
ROBERT W. CARSTENS.
BY
Wallace P. Lamb
ATTORNEY.

United States Patent Office 3,049,031
Patented Aug. 14, 1962

3,049,031
LOCATING AND GUIDE DEVICE
Robert W. Carstens, 17203 Faulman, Fraser, Mich.
Filed Mar. 29, 1961, Ser. No. 99,295
4 Claims. (Cl. 77—62)

This invention relates generally to tools and particularly to tools for accurately establishing a point on a surface and for guiding tools relative to the established point.

In the tool making industry, the accurate locating of a reference or construction point on a metal surface from which, for example, other points may be established on the surface for machine operation in boring, milling or for checking has always presented a problem. The procedures in use today, as will be appreciated by those skilled in the art, require the optimum in patience and skill in the locating of construction points on a surface and small but unacceptable inaccuracies occur even to the most skilled tool makers. Then again in the locating and drilling of holes, and this also applies to template making, inaccuracies will occur both in the locating of drill center points and as a result of drill walking, as it is referred to in the industry. For example, it is the practice to scribe, on a metal work surface, crossed lines from information supplied usually from a drawing, the intersection of the crossed lines establishing, of course, the center of the hole to be drilled. The procedure then is to set a punch on the intersection of the crossed lines and strike the punch with a blow sufficient to indent the surface for receiving a drill point. Anyone who has tried this will appreciate the difficulty of punching the center accurately on the intersection of the crossed lines, but even if the drill point receiving dent is located accurately, the problem of drill walking still exists.

Accordingly, it is an object of my invention to provide a device for obviating the above mentioned difficulties.

Another object of the invention is to provide a device which can be readily located on a metal surface to establish a construction point from which other points may be located quickly and accurately by like devices.

Another object of the invention is to provide a construction point locating device which can be readily positioned and aligned with the intersection of crossed lines on a metal surface or be located by horizontal and vertical blocks positioned in accordance with given reference lines or edges of a template or machine part.

Another and specific object of the invention is to provide a device including a drill bushing which may be readily attached magnetically to a work surface and include provisions for opposing so called drill walking.

Another object of the invention is to provide a center point locating device which can be set to hold magnetically to the surface of a part or template with sufficient force to avoid being displaced by the normal use of a center punch or drill and yet one which can be readily attached and removed from the said surface.

Other objects of the invention will become apparent from the following description, taken in connection with the accompanying drawing in which:

FIG. 1 is a plan view of my device illustrated on a surface of a template shown in dot and dash lines;

FIG. 2 is a side elevation;

FIG. 3 is an enlarged vertical sectional view, taken along line 3—3 of FIG. 1;

FIG. 4 is an end view, taken in the direction of the arrows 4—4 of FIG. 2;

FIG. 5 is a cross sectional view of the device, taken along the line 5—5 of FIG. 3;

FIG. 6 is a perspective view of a lens for use with the device;

FIG. 7 is an elevational view of a punching tool, and

FIG. 8 is an end view of the tool of FIG. 7.

Referring to the drawings by characters of reference, my device, designated generally by the numeral 10, is shown in FIGS. 1, 2 and 3 positioned on a metal surface on which the device is to be temporarily located as representative of a construction point on the surface. The part or plate 12 shown in dot and dash lines may be a part to be machined or a template being layed out or any part having magnetic properties and on a surface of which it is desired to locate points either as reference points for the laying out of other points, or as reference points for the subsequent performing of machine operations, including the drilling of holes. In the illustration of FIG. 1, the device 10 is shown as being aligned on the intersecting point of crossed lines 14 previously layed out on the surface of part 12, but it will be understood that the device 10 may be located on the surface of part 12 in other ways, such as by means of the well known horizontal and vertical blocks, for example.

The device 10 comprises in general an alignment member or inner sleeve 16, and a holding member or outer sleeve 18. The outer sleeve 18 is carried by the inner sleeve 16, as illustrated in FIG. 2, the sleeves being concentric and relatively slidable along their common longitudinal axis. A coil spring 20, interposed between the sleeves 16 and 18 functions to move the sleeve relative to each other in opposite directions to position the lower end of the outer sleeve a preselected distance above the lower end of the inner sleeve, as shown in FIG. 2. Such movement of the sleeves 16 and 18 is limited by cooperating stop members on the sleeves, specifically an internal shoulder 22 on the outer sleeve 18 and a snap-in retainer ring 24 on and near the upper end of the inner sleeve 16.

The outer sleeve 18 is provided with radially spaced bores respectively to receive permanent magnets 26 which extend parallel to the longitudinal axis of the sleeve and have their positive pole ends, as at 28, preferably flush with the lower end of the sleeve. These magnets 26, collectively have an attractive force which, when the sleeve is moved down to plate 10, is sufficiently strong to hold spring 20 compressed and through the spring hold the inner sleeve 16 to the metal surface of plate 10. The differential force between the attractive force of the magnets 26 and the spring 20 is made such that the inner sleeve 16 will be firmly held to the plate surface, yet allow for ready removal of the device simply by picking it up which is made easier by tilting it.

The inner sleeve 16 is an open-ended sleeve made with an enlarged portion or flange 30 at its lower end and provided in the end face thereof is an annular recess wherein is retained a friction member, preferably a displaceable and resilient rubber ring 32, frictionally held in the recess. This rubber ring 32 provides a circular and high frictional seat on the plate surface which opposes lateral sliding movement of the device 10 on the plate. As shown, the rubber ring 32 projects slightly or about one thirty-second of an inch below the lower end of the sleeve 16 depending on the displacement characteristic of the rubber. When the outer sleeve 18 is in its "down" position, the force of the magnets 26, in addition to overcoming spring 20, is also sufficient to displace the rubber ring into its recess so as to hold the lower end of the inner sleeve 16 including an annular facing of rubber flat against the plate surface.

In FIG. 6 there is shown a citing tool to aid in aligning the longitudinal axis of sleeve 16 with the intersection point of crossed lines 12 on the surface of the plate 14. The citing tool comprises a lens 34 having a rod-like extension 36 on the end of which there is enscribed a pair of crossed lines 37, 38 and also preferably a number of circles 40, 42 and 44 representative of the diameters of certain standard drill sizes. The diameter of the rod 36 is made such that the rod will fit snugly, but slidably into the inner sleeve 16 and the length of the rod 36 may be made such that the enscribed end will seat on the surface of plate 14. This citing tool may be made of a suitably clear plastic material and makes it possible to readily align the enscribed crossed lines and circles with like marks on the metal surface, thus accurately positioning the longitudinal axis of sleeve 16 with respect to a point on the metal surface.

In instances where it is only desired to position the device 10 on a surface as being representative of a construction or reference point from which to lay out other points, this as previously mentioned may be done by using horizontal and vertical locating blocks engaging the outer periphery of the outer sleeve 18, or where crossed lines have been located, the device 10 may be positioned accurately on the point by the aid of the lens 34. Then from the outer periphery of the outer sleeve 18 as representative of a basic point, other locating points for various machine operations may be accurately established and be represented by other devices like device 10.

Where a hole is to be drilled, the device 10 is located as above mentioned and then a punch 46 is inserted into the inner sleeve 16 and struck a blow sufficient to indent the surface of the plate 10. The present punch 46 is provided on one end thereof with the usual center point 48 and encircling point 48 is a circle punch 50. To drill the hole, I insert a drill bushing 52 within the inner sleeve 16 of device 10, the lower end of the bushing having an extended circular ring 54 adapted to engage in the circular indentation made by the circle punch 50. This holds the drill against walking. As shown in FIG. 3, the drill bushing 52 is threaded to screwthread into the upper end of sleeve 16 and thus the bushing is held by the magnets 26 to the plate surface with the circular extension 54 in the circular indentation opposing side thrust on the device so as to insure the accurate drilling of the hole.

While I have shown and described my device in considerable detail, it will be understood that many changes and variations of the device may be made without departing from the spirit and scope of the invention.

What I claim is:

1. A device for placement on a surface of a part to guide a center point marker or drill comprising an inner open-ended sleeve to receive and guide the center point marker or drill and having one end to seat on the part, an open-ended outer sleeve slidably received on said inner sleeve and having one end corresponding to and facing in the same direction as the said one end of said inner sleeve, spring means interposed between and urging said inner and outer sleeves in opposite directions, cooperating stop means on said inner and outer sleeves limiting axial movement of said inner and outer sleeves to space the said one end of said outer sleeve a predetermined distance from the corresponding one end of said inner sleeve, magnetic means in said outer sleeve having its positive pole exposed at the said one end of said outer sleeve, said magnetic means having a force to overcome said spring means and hold said inner sleeve to the plate following manually moving said outer sleeve down to the plate, and a resilient friction member carried by the said one end of said inner sleeve and displaceable by the magnetic force of said magnets to oppose lateral movement by forces acting transversely to the magnetic flux.

2. A device for placement on a surface of a part to guide a center point marker or drill comprising an inner open-ended sleeve to receive and guide the center point marker or drill and having one end to seat on the part, an open-ended outer sleeve slidably received on said inner sleeve and having one end corresponding to and facing in the same direction as the said one end of said inner sleeve, spring means interposed between and urging said inner and outer sleeves in opposite directions, cooperating stop means on said inner and outer sleeves limiting axial movement of said inner and outer sleeves to space the said one end of said outer sleeve a predetermined distance from the corresponding one end of said inner sleeve, permanent magnetic means in said outer sleeve having their positive ends exposed at the said one end of said outer sleeve, said magnetic means having a magnetic force to overcome said spring means and hold said inner sleeve to the plate upon manually moving said outer sleeve down to the plate, said inner sleeve having an annular recess in the said one end thereof, and a displaceable rubber ring seat retained in said recess and displaced by the magnetic force of said magnetic means to oppose displacement by forces acting transversely to the magnetic flux.

3. A device for representing the location of a point on a surface of metal of magnetic properties comprising an inner open-ended sleeve member having a lower end to seat on the metal surface and a longitudinal axis coincidental with the point to be represented, an open-ended outer sleeve member carried by and axially slidable on said inner sleeve member, said outer sleeve member having a lower end normally spaced a preselected distance above the lower end of said inner sleeve member, cooperating stop means on said sleeve members limiting relative axial movement of said sleeve members to said preselected distance, spring means biasing said sleeve members and limited by said stop means, magnetic means on the lower end of said outer sleeve member operable when said outer sleeve member is moved down to the metal surface to hold said inner sleeve member to the metal surface, and resilient friction means on the lower end of said inner sleeve member engageable with the metal surface and displaceable by said magnetic means to oppose lateral displacement of said inner sleeve member by forces acting transversely to the magnetic flux.

4. A device for representing the location of a point on a surface of metal of magnetic properties comprising an inner open-ended sleeve member having a lower end to seat on the metal surface and a longitudinal axis coincidental with the point to be represented, an open-ended outer sleeve member carried by and axially slidable on said inner sleeve member, said outer sleeve member having a lower end normally spaced a preselected distance above the lower end of said inner sleeve member, cooperating stop means on said sleeve members limiting relative axial movement of said sleeve members to said preselected distance, spring means biasing said sleeve members and limited by said stop means, magnetic means on the lower end of said outer sleeve member operable when said outer sleeve member is moved down to the metal surface to hold said inner sleeve member to the metal surface, said inner sleeve having an annular recess in the lower end thereof, and a resilient and displaceable rubber ring received in said recess and normally projecting therefrom to seat on the metal surface, said ring displaceable entirely within said recess and held therein by said magnetic means to oppose lateral movement of said inner sleeve member.

References Cited in the file of this patent

UNITED STATES PATENTS 2,861,484     Rance _____ Nov. 25, 1958

FOREIGN PATENTS 816,184     Germany _____ Oct. 8, 1951